(12) United States Patent
Drews

(10) Patent No.: US 6,647,494 B1
(45) Date of Patent: *Nov. 11, 2003

(54) SYSTEM AND METHOD FOR CHECKING AUTHORIZATION OF REMOTE CONFIGURATION OPERATIONS

(75) Inventor: Paul Drews, Gaston, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/332,766

(22) Filed: Jun. 14, 1999

(51) Int. Cl.[7] .............................................. H04L 12/22
(52) U.S. Cl. ............................ 713/170; 713/201; 713/1
(58) Field of Search ................................ 713/1, 2, 100, 713/189, 170, 168, 155, 201

(56) References Cited

U.S. PATENT DOCUMENTS

| 5,022,077 A | 6/1991 | Bealkowski et al. |
|---|---|---|
| 5,444,850 A | 8/1995 | Chang |
| 5,473,692 A | 12/1995 | Davis |
| 5,539,828 A | 7/1996 | Davis |
| 5,568,552 A | 10/1996 | Davis |
| 5,633,932 A | 5/1997 | Davis et al. |
| 5,751,809 A | 5/1998 | Davis et al. |
| 5,796,840 A | 8/1998 | Davis |
| 5,799,141 A | * 8/1998 | Galipeau et al. ............... 714/13 |
| 5,805,706 A | 9/1998 | Davis |
| 5,805,712 A | 9/1998 | Davis |
| 5,818,939 A | 10/1998 | Davis |
| 5,825,879 A | 10/1998 | Davis |
| 5,828,753 A | 10/1998 | Davis |
| 5,835,594 A | 11/1998 | Albrecht et al. |
| 5,844,986 A | * 12/1998 | Davis .......................... 713/187 |
| 5,907,619 A | 5/1999 | Davis |
| 5,974,416 A | * 10/1999 | Anand et al. .................. 707/10 |
| 6,070,246 A | * 5/2000 | Beser .......................... 713/201 |
| 6,185,612 B1 | * 2/2001 | Jensen et al. ............... 709/223 |
| 6,427,227 B1 | * 7/2002 | Chamberlain ................ 717/124 |
| 2002/0019941 A1 | * 2/2002 | Chan et al. .................. 713/185 |

* cited by examiner

Primary Examiner—Gilberto Barron
Assistant Examiner—Grigory Gurshman
(74) Attorney, Agent, or Firm—Blakely, Sokoloff, Taylor & Zafman LLP

(57) ABSTRACT

The present invention provides a system and method for checking authorization of remote configuration operations. The method comprises generating a request credential manifest to request an update of configurable parameters on a client platform. Furthermore, the method comprises signing the request credential manifest with a manifest digital signature, which was generated using a private key in a cryptographic key pair. In addition, the method further comprises verifying the manifest digital signature using a public key to ascertain that the request credential manifest was generated by an authorized console platform.

20 Claims, 6 Drawing Sheets

SYSTEM AND METHOD FOR CHECKING AUTHORIZATION OF REMOTE CONFIGURATION OPERATIONS

BACKGROUND (1) Field

This invention relates to the field of security of computer systems or platforms, especially in the areas where sensitive data or parameters on a platform is remotely configured via request messages.

(2) General Background

Data stored on computer systems or platforms in a network can be remotely updated or configured. In certain cases, the data is extremely sensitive. A good example of configurable sensitive data is the Basic Input and Output System (BIOS) of a computer system. Typically stored in some form of non-volatile memory, the BIOS is machine code, usually part of an Operating System (OS), which allows the Central Processing Unit (CPU) to perform tasks such as initialization, diagnostics, loading the operating system kernel from mass storage, and routine input/output ("I/O") functions. Upon power up, the CPU will "boot up" by fetching the instruction code residing in the BIOS. Without any security protection the BIOS is vulnerable to attacks through capturing and replaying request messages to remotely update configurable parameters stored in the BIOS. These attacks may corrupt the BIOS and disable the computer system.

Accordingly, there is a need to provide a system and method to verify the integrity of remote request messages for configurations operations and to enforce proper authorization limits of those remote request messages.

SUMMARY

A system and method for checking authorization of remote configuration operations is described. The method comprises generating a request credential manifest to request an update of configurable parameters on a client platform. Furthermore, the method comprises signing the request credential manifest with a manifest digital signature, which was generated using a private key in a cryptographic key pair. In addition, the method comprises verifying the manifest digital signature using a public key to ascertain that the request credential manifest was generated by an authorized console platform.

DETAILED DESCRIPTION OF THE INVENTION

The present invention provides a system and method for checking authorization of remote configuration operations. In the following detailed description, the following terms are used to described the current invention:

A "key" is an encoding and/or decoding parameter used by conventional cryptographic algorithms such as Rivest, Shamir and Adleman (RSA), Data Encryption Algorithm (DEA) as specified in Data Encryption Standard (DES), and the like.

A "key pair" includes a "private" key and a "public" key. A "private key" is held by the owner or "issuer" of the key pair. A "public" key is widely published using a "certificate".

A "certificate" is a message in a standardized format containing at least the following items: a public key, a private key, and a digital signature created using the private key.

A "digital signature" is similar to a certificate but is typically used for authenticating sources of messages.

A "platform" is a single computing device. Illustrative examples of a platform may include a Personal Computer (PC), a mid-range workstation such as a Sun Microsystem SPARC workstation, or a server.

A "globally-unique identifier" (GUID) is a unique numerical value that identifies an entity or an object. It should be noted that algorithms for generating GUIDs are known in the art.

Figure 1:
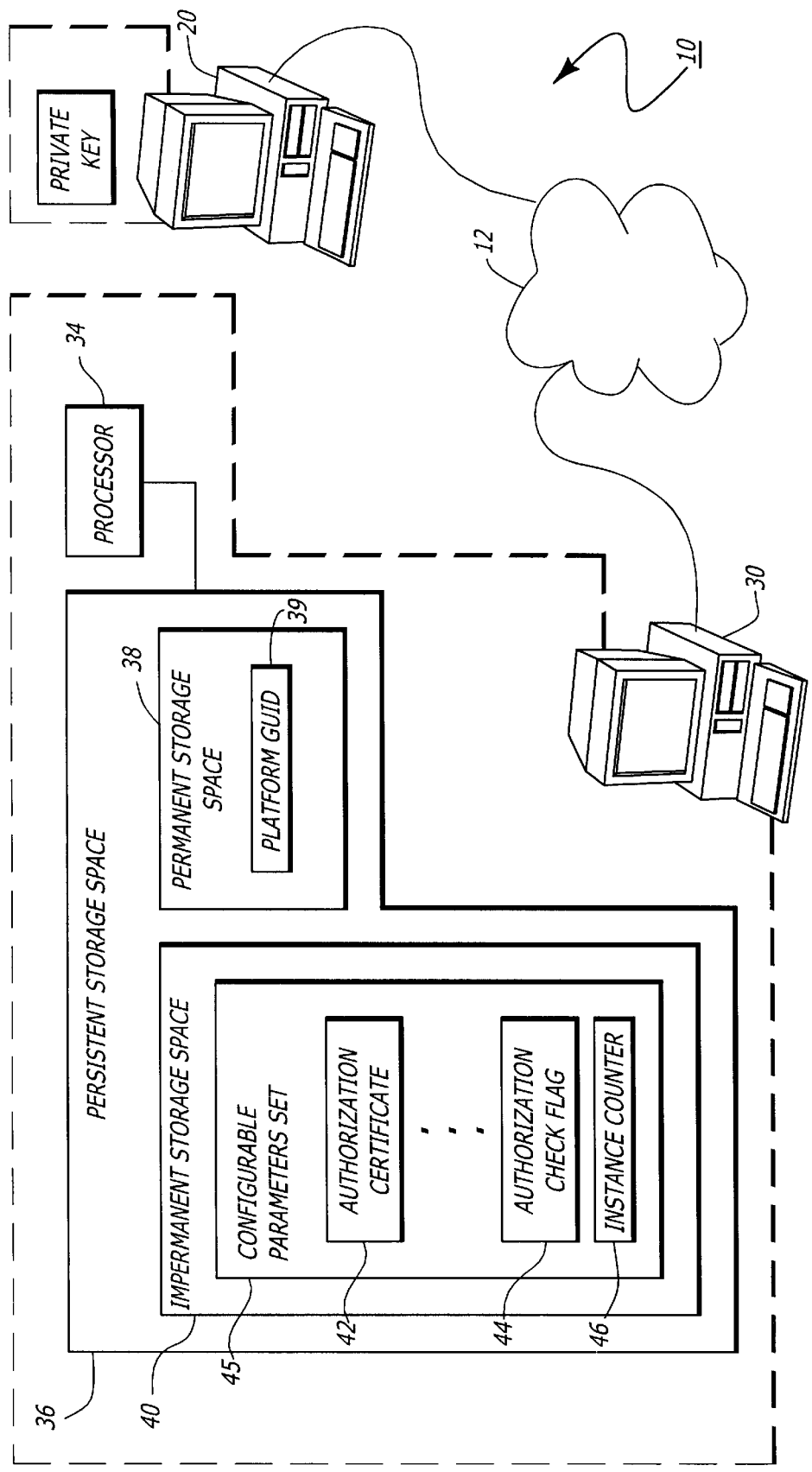
FIG. 1 illustrates a system for checking authorization of remote configuration operations in accordance with one embodiment of the present invention.

FIG. 1 shows an exemplary system 10 in accordance with the current invention. The system includes a network 12 coupling a console platform 20 and a client platform 30. The console platform 20 includes a private key 22 which is used to generate digital signatures and a message generator to create a request credential manifest described below. The client platform has a processor 34 and a persistent storage space 36. Persistent storage space 36 is used to hold data that survive a reboot of a platform. Illustrative examples of storage media which may be used to implement the persistent storage space include FLASH memory, battery-backed memory, EPROM, hard disk, or the like.

In one embodiment, persistent storage space 36 is divided into a permanent storage space 38 and an impermanent storage space 40. Permanent storage space 38 holds data that cannot be configured or updated. Impermanent storage space 40, however, holds data that can be configured or updated.

Configurable or updatable data entities stored in impermanent storage space 40 preferably includes an instance counter 46 and a configurable parameters set 45. Each of these data entities plays a role preserving the integrity and ensuring the security of the platforms and the network. The functions of these data entities will be explained below in more details.

The instance counter 46 supplies a non-repeating numerical value to identify each instance when a configurable parameter 42 or 44 is modified. In one embodiment, the instance counter is a monotonic counter that is incremented every time a configurable parameter in the configurable parameters set 45 is modified. However, other techniques or algorithms can be used to generate non-repeating values.

Figure 2:
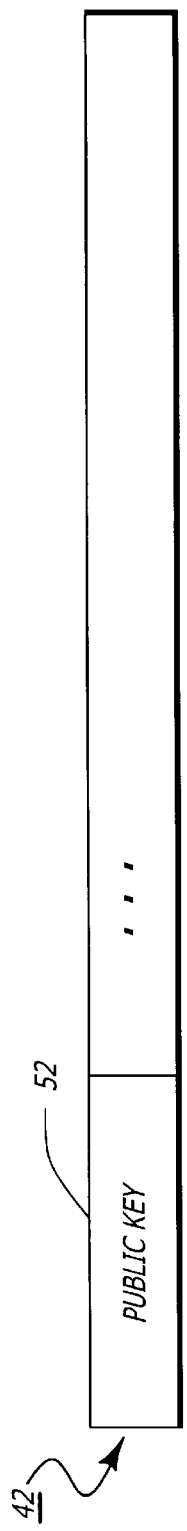
FIG. 2 shows an authentication certificate in accordance with one embodiment of the present invention.

The configurable parameters set 45 includes an authorization certificate 42. The authorization certificate provides security information that client platform 30 uses to perform integrity checks and authenticate the sources of request messages or work orders that client platform 30 receives. As shown in FIG. 2, the authorization certificate 42 includes at least the following fields: a public key 52 published by an authorized console platform, a private key 54 that corresponds to the public key, and a digital signature 56 which is generated using the private key.

The configurable parameters set 45 may also include other configurable parameters. For example in one embodiment, the configurable parameters set includes an authorization check flag 44 which has either an on or off value to specify whether integrity and security checks should or should not be performed.

Figure 4:
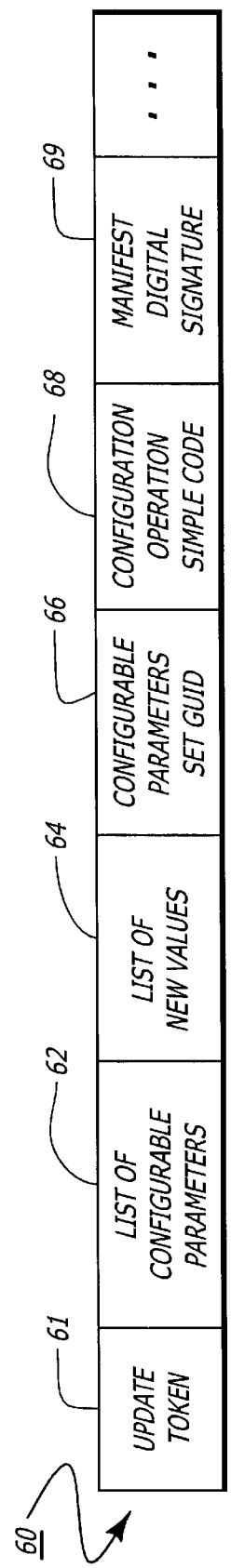
FIG. 4A and 4B show different embodiments of request credential manifests in accordance with the present invention.

To update configurable parameters 42 or 44 held in the impermanent data storage space 40, console platform 20 creates and issues request credential manifests to client platform 30. FIGS. 4A and 4B show different embodiments of request credential manifests 42.

Figure 3:
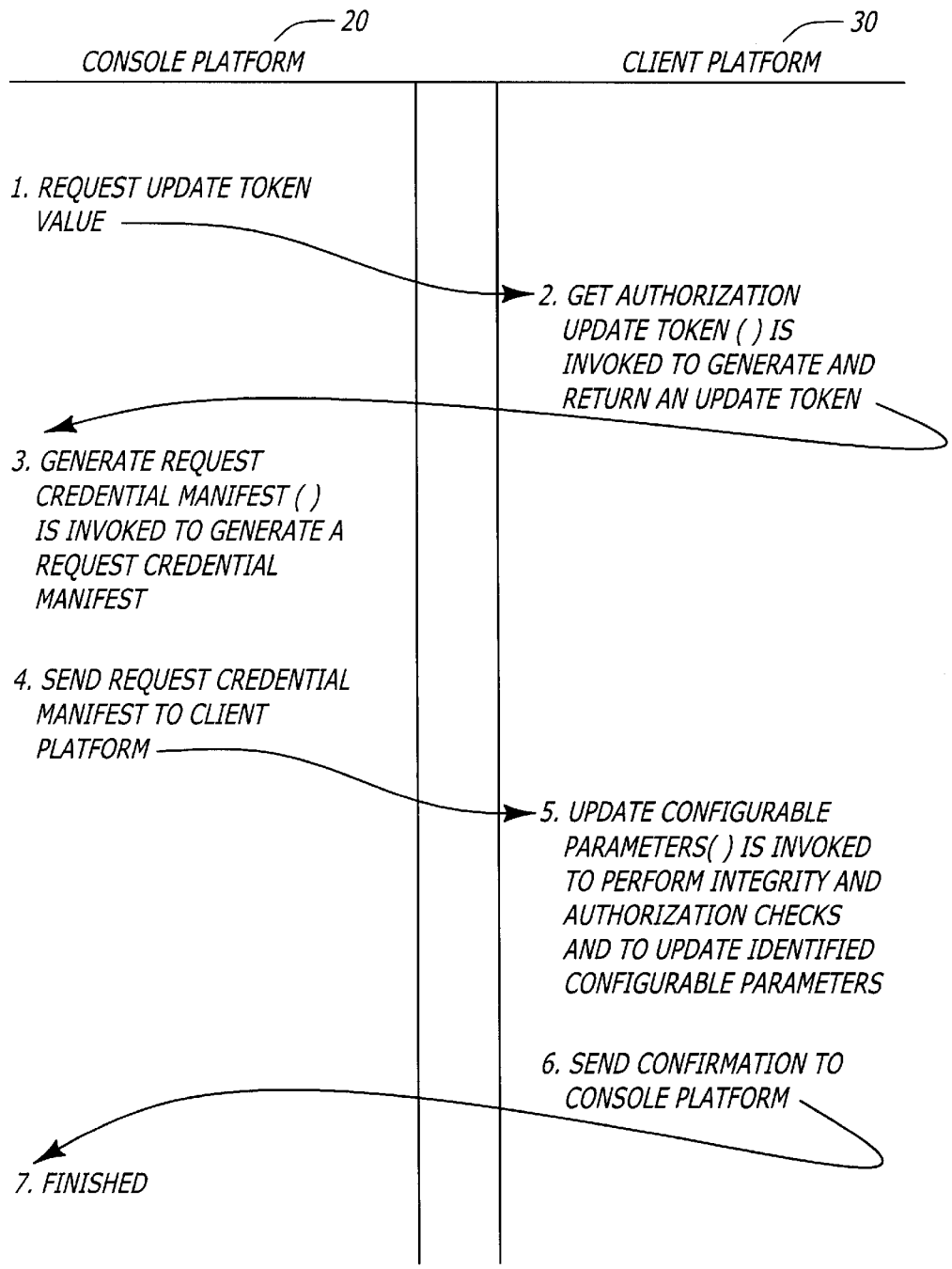
FIG. 3 illustrates an interactive sequence between a console platform and a client platform in accordance with one embodiment of the present invention.

Referring to FIG. 3, an illustrative embodiment of an interactive sequence between console platform 20 and client platform 30 is shown. Console platform 20 requests an update token from client platform 30. An update token is a hash value that console platform needs to construct a request credential manifest. As shown in FIGS. 4A and 4B, update token 61 is incorporated in a request credential manifest 60 to guard against attacks based on capturing and replaying an identical or altered request credential manifest to client platform. In one embodiment, update token includes at least the following information:

1. A client platform globally-unique identifier (GUID)—This GUID is a unique numerical value identifying a client platform. Each client platform on the network is assigned a different platform GUID, which is maintained in each client platform's permanent data storage space. Inclusion of client platform GUID in a request credential manifest prevents attacks based on capturing the request credential manifest sent to one client platform and re-directing the captured manifest to another client platform.

2. The current value of instance counter—As stated above, instance counter supplies a unique numerical value to identify each instance a configurable parameter is modified. Herein, instance counter is a monotonic counter which is incremented every time a configurable parameter in the configurable parameters set is modified. However, other techniques or algorithms can be used to generate non-repeating values. Inclusion of the current value of the instance counter in a request credential manifest prevents attacks based on capturing a request credential manifest and replaying the captured manifest at a later time.

3. A configurable parameters set GUID—This GUID identifies the configurable parameters set stored in impermanent data storage space of a client platform. Inclusion of the configurable parameters set GUID in a request credential manifest prevents attacks based on capturing a request credential manifest and replaying the captured manifest with a different configurable parameters set.

Figure 5:
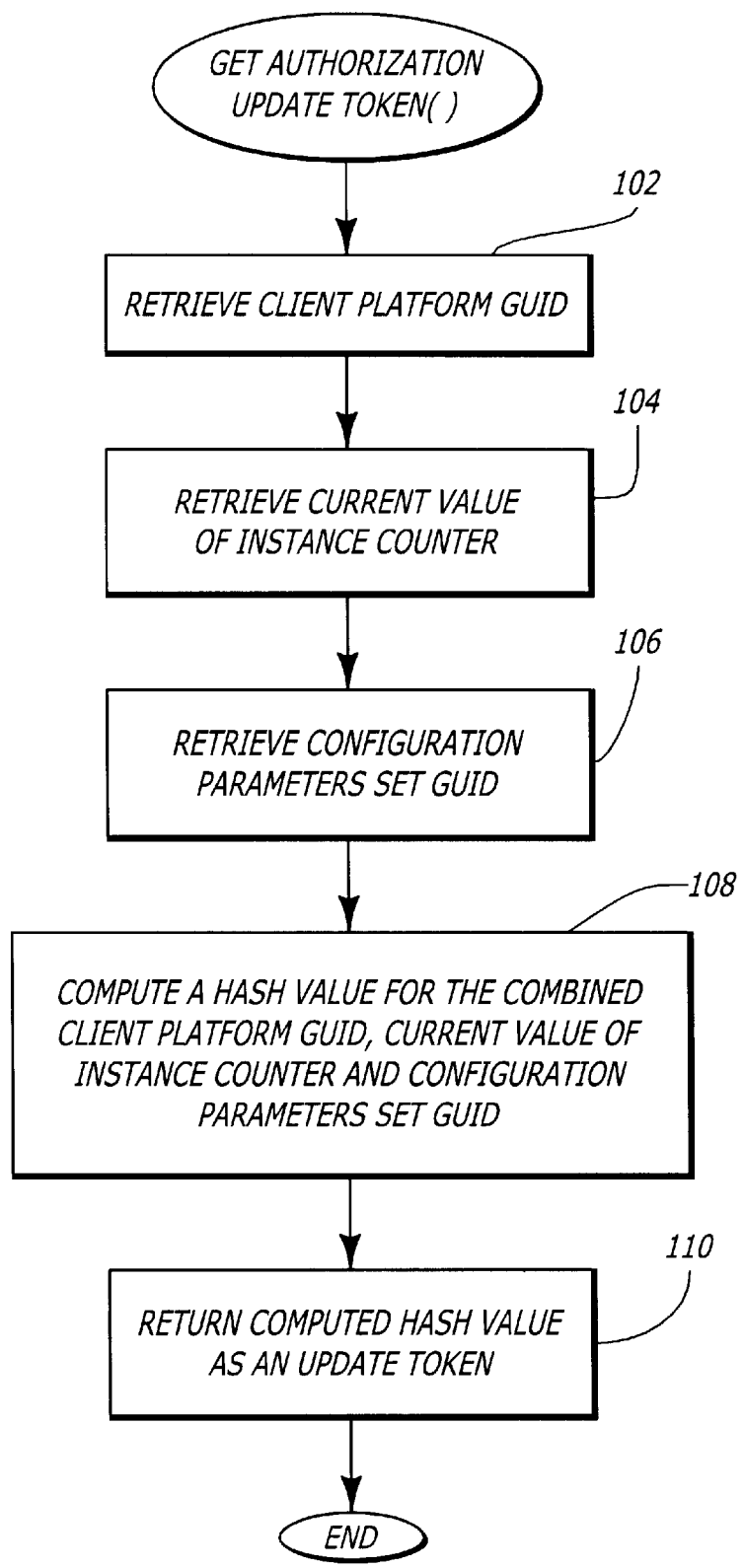
FIG. 5 is a flow diagram illustrating the creation of an update token in accordance with one embodiment of the present invention.

Referring to FIG. 3, client platform 30 provides an interface named GetAuthorizationUpdateToken( ) to create and return an update token. FIG. 5 outlines the flow of GetAuthorizationUpdateToken( ). As shown in blocks 102, 104, and 106 of FIG. 5, client platform GUID, current value of the Instance counter, and configurable parameters Set GUID are retrieved. A hash value is computed for a combination of client platform GUID, current value of the instance counter, and configurable parameters Set GUID (block 108). The computed hash value is returned as an update token (block 110).

It should be noted that algorithms to compute hash values are well known in the art. Those skilled in the art will recognize that a hash function suitable for use in embodiments of the present invention is one that can compute one-way and collision-free hash values.

Figure 6:
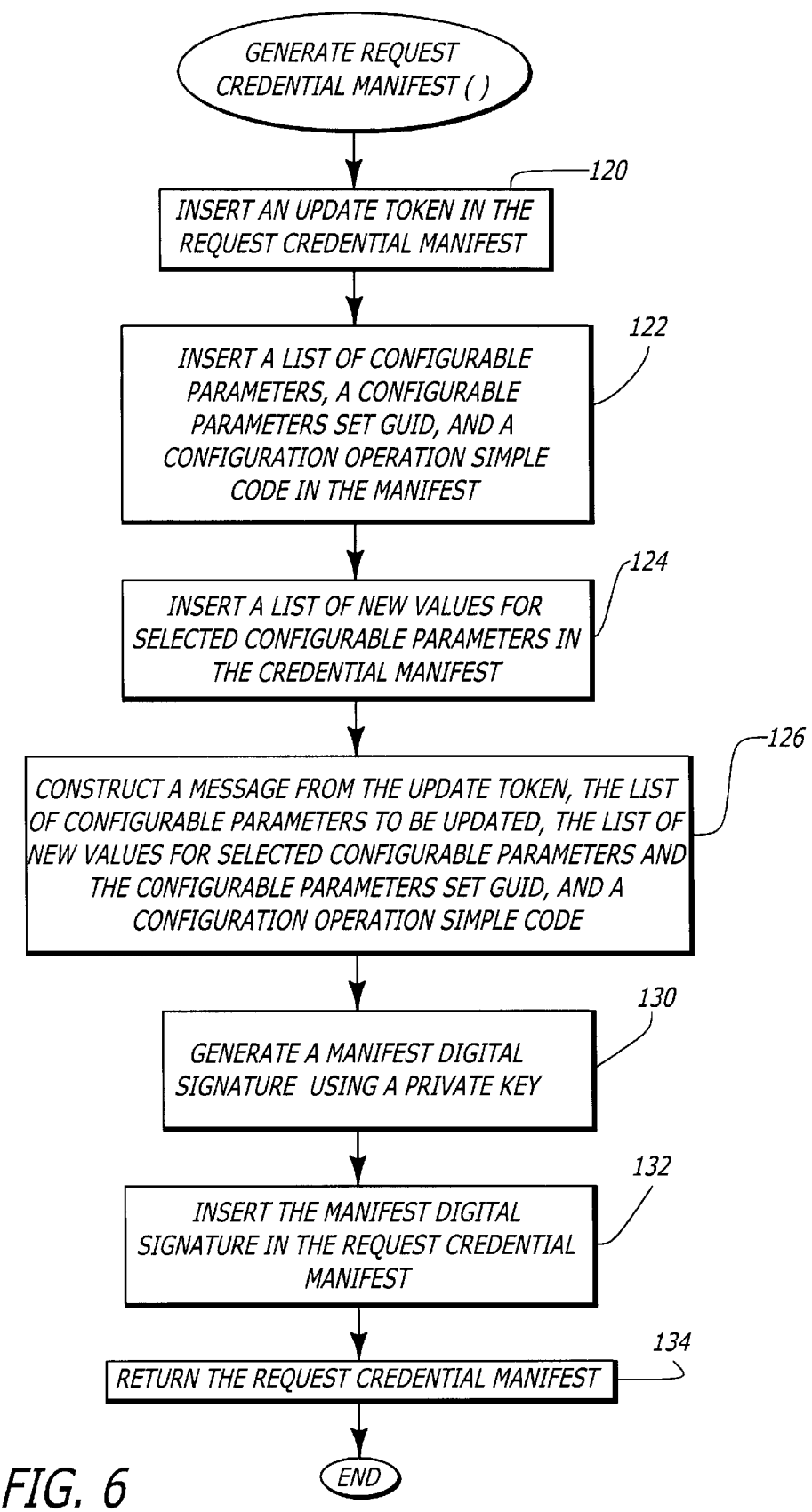
FIG. 6 is a flow diagram illustrating the generation of a request credential manifest in accordance with one embodiment of the present invention.

Returning back to FIG. 3, after client platform 30 returns update token to console platform 20, console platform assembles a request credential manifest using update token and adding information describing a request to update configurable parameters. In one embodiment, console platform 20 provides an interface named GenerateRequestCredentialManifest( ) for creating a request credential manifest. FIG. 6 shows the flow of GenerateRequestCredentialManifest( ).

Referring to FIG. 4A, request credential manifest 60 preferably includes update token 61, a list of configurable parameters to be updated 62, a list of new values for those configurable parameters 64, and a manifest digital signature 66.

Referring to FIG. 6, update token, the list of onfigurable parameters list, and the list of new values are inserted into the request credential manifest (blocks 120, 122, and 124). As stated above, update token is a hash value of a combination of client platform GUID, current value of the Instance counter, and configurable parameters set GUID. The update token is included in the request credential manifest to guard against attacks based on capturing and replaying an identical or altered manifest to a client platform.

Referring to FIG. 4A, manifest digital signature 66 is generated from the content of request credential manifest 60 and is included in the manifest 60. As described later, client platform uses the manifest digital signature to verify the integrity and enforce proper authorization limits of request credential manifest.

Returning back to FIG. 6, blocks 126, 128, 130, and 132 describe the creation of a manifest digital signature. In the art of cryptography, the act of creating a digital signature for a message using a private key is known as "signing" the message. It should be noted that algorithms to sign a message or to create digital signatures for a message are known in the art. It should be further noted that existing algorithms for creating digital signatures generally include computing a hash value of the message to be signed and encrypting the hash using a private key, as shown in steps 126, 128, and 130.

It is contemplated that the Digital Signature Algorithm ("DSA") proposed by the National Institute of Standards and Technology may be used. It is also contemplated that the Rivest, Shamir, and Adleman ("RSA") algorithm may be used. It should be noted, however, that other algorithms for generating digital signatures may be employed in the present invention.

As shown in FIG. 6, console platform constructs an abstract message that includes update token, identities of configurable parameters to be updated, and new values for those configurable parameters (block 126). A hash value is then computed for the abstract message (block 128). A manifest digital signature is generated by encrypting the hash value for the abstract message using a private key that corresponds to the public key that the client platform stores in the authorization certificate (block 130).

Referring to FIG. 4B, other information fields may also be included in the request credential manifest. FIG. 4B shows an alternative request credential manifest 60, which includes configuration operation GUID 68 and configuration operation simple code 69. Configuration operation GUID and configuration operation simple code are useful in an embodiment that provides multiple types of configuration operations. In such embodiment, configuration operation GUID uniquely identifies each type of configuration operation, thereby guards against attacks based on replaying a configuration operation extracted from one request credential manifest together with a list of configuration parameters extracted from another request credential manifest.

Configuration operation simple code 69 is a simple numerical value assigned to each of the multiple configuration operations to enhance the readability of request credential manifest 60. For example, a system administrator in troubleshooting problems on a system may examine the configuration operation simple code in a captured request credential manifest and may easily decipher the type of configuration operation that was requested in the manifest.

Returning back to FIG. 3, console platform 20 sends the request credential manifest to client platform 30 after the manifest is constructed. Upon receiving the request credential manifest, client platform performs the integrity and authority checks, updates configurable parameters as requested in the manifest, and returns a confirmation to console platform. In one embodiment, client platform provides an interface named UpdateConfigurableParameters( ) to generally perform integrity and authority checks on the request credential manifest and update configurable parameters as requested by the manifest.

Figure 7:
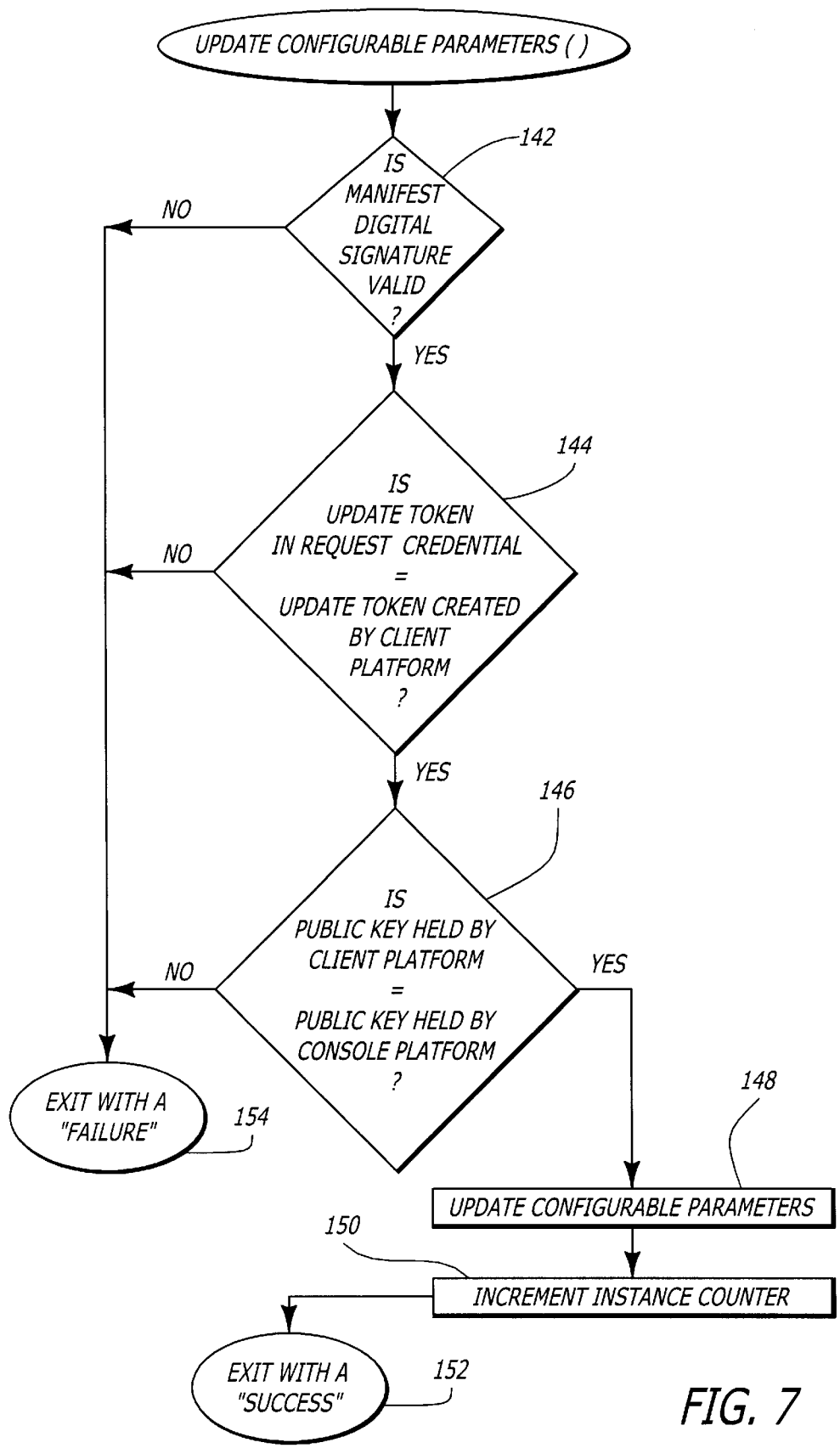
FIG. 7 is a flow diagram illustrating the verification of a request credential manifest and the updating of configurable parameters in accordance with one embodiment of the present invention.

FIG. 7 shows the flow of UpdateConfigurable Parameters( ). Blocks 140, 142, 144, 146, 148, and 150 together show the verification of a request credential manifest by examining the manifest digital signature included in the manifest. The update token, the list of configurable parameters to be updated, and the list new values for those configurable parameters are first extracted from the request credential manifest (block 140), and an abstract message is then constructed from these extracted values (block 142). A hash value for the abstract message is computed (block 144). In blocks 146 and 148, the manifest digital signature is extracted from the request credential manifest and decrypted using a public key. As depicted in FIG. 2, the public key 52 is included in authorization certificate 42. As illustrated in FIG. 1, the authorization certificate 42 is stored in impermanent data storage space 40 of client platform 30.

Returning back to FIG. 7, the decrypted manifest digital signature is compared to the computed hash value for abstract message (block 150). If the hash value for abstract message equals decrypted manifest digital signature, it is verified that the request credential manifest has not been corrupted during transit from console platform to client platform. It is also verified that the request credential manifest was sent from an authorized console platform. Accordingly, configurable parameters are updated as requested in the request credential manifest (block 152). If the hash value for abstract message does not equal to the decrypted manifest digital signature, configurable parameters are not updated. After verifying the request credential manifest and updating configurable parameters, instance counter is incremented (block 154).

Returning back to FIG. 3, client platform 30 sends a confirmation is to console platform 20 signifying that the configuration operations requested by the request credential manifest has been completed.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system to verify authorization of requests to perform configuration operations, the system comprising:
   a cryptographic key pair including a public key and a private key;
   a console platform to generate a request credential manifest to request an update of configurable parameters, the request credential manifest comprises a manifest digital signature created using the private key and an update token that comprises a hash value for a combination of a first globally-unique identifier (GUID), a current value of an instance counter, and a configurable parameters set GUID; and
   a client platform to verify the manifest digital signature using the public key to ascertain that the console platform has proper authority to request the update of the configurable parameters.

2. The system of claim 1, wherein the request credential manifest further includes a list of selected configurable parameters to be updated, and a list of new values for the selected configurable parameters.

3. The system of claim 1, wherein the configurable parameters set GUID of the request credential manifest to uniquely identify a configurable parameters set stored in the client platform.

4. The system of claim 1, wherein the request credential manifest further includes a configuration operation simple code to provide a numerical representation of a configuration operation.

5. The system of claim 1, wherein the configurable parameters are stored in persistent storage space on the client platform.

6. A console platform to generate requests to perform configuration operations, the console platform comprising:
   a private key belonging to a cryptographic key pair; and
   a message generator to create a request credential manifest to update configurable parameters on a client platform, the request credential manifest comprises a manifest digital signature created using the private key and an update token that comprises a hash value for a combination of a client platform globally-unique identifier (GUID), a current value of an instance counter, and a configurable parameters set GUID.

7. The console platform of claim 6, wherein the request credential manifest further comprises a list of selected configurable parameters to be updated, and a list of new values for the selected configurable parameters.

8. The console platform of claim 6, wherein the request credential manifest further comprises:
   a configuration operation simple code which is a numerical representation of the configuration operation.

9. A client platform to verify authorization of requests to perform configuration operations, the client platform comprising:
   a memory to store a public key belonging to a cryptographic key pair and an update token being a hash value for a combination of a client platform globally-unique identifier (GUID), a current value of an instance counter, and a configurable parameters set GUID; and
   a processing unit to verify a manifest digital signature in a request credential manifest using the public key to ascertain that the request credential manifest was generated by an authorized source.

10. The client platform of claim 9, wherein the update token is a hash value of the client platform globally-unique identifier (GUID), the current value of an instance counter, and the configurable parameters set GUID.

11. The client platform of claim 9, wherein the request credential manifest further includes a list of selected configurable parameters to be updated, and a list of new values for the selected configurable parameters.

12. The client platform of claim 9, wherein the request credential manifest further comprises:

a configuration operation simple code which is a numerical representation of the configuration operation.

13. A method verify authorization of requests to perform configuration operations, comprising:

generating a request credential manifest to request an update configurable parameters on a client platform by generating an update token including a hash value for a combination of a client platform globally-unique identifier (GUID), a current value of an instance counter, and a configurable parameters set GUID;

signing the request credential manifest with a manifest digital signature generated using a private key; and verifying the manifest digital signature using a public key to ascertain that the request credential manifest was generated by an authorized console platform.

14. A method to verify authorization of requests to perform configuration operations, comprising:

generating a request credential manifest by (i) constructing an abstract message from an update token, a list of configurable parameters to be updated, and a list of new values for those configurable parameters, (ii) computing a hash value for the abstract messages and, (iii) encrypting the hash value using a private key to generate the manifest digital signature;

signing the request credential manifest with a manifest digital signature generated using a private key; and verifying the manifest digital signature using a public key to ascertain that the request credential manifest was generated by an authorized console platform.

15. The method of claim 14, wherein the verifying the manifest digital signature includes:

constructing an abstract message from values extracted from the request credential manifest, the values including an update token, a list of configurable parameters to be updated, and a list of new values for those configurable parameters;

computing a hash value for the abstract message;

decrypting the manifest digital signature using a public key to produce a decrypted digital signature; and comparing the hash value to the decrypted digital signature.

16. The method of claim 13, further comprises incrementing an instance counter.

17. The method of claim 14, further comprises updating configurable parameters of the list of configurable parameters as specified by the request credential manifest.

18. A computer program embodied on a computer-readably medium to verify authorization of requests to perform configuration operations, comprising:

a cryptographic key pair including a private key and a public key;

a message generator to create a request credential manifest to update configurable parameters on a client platform, the request credential manifest including a manifest digital signature created using the private key and an update token that comprises a hash value for a combination of a client platform globally-unique identifier (GUID), a current value of an instance counter, and a configurable parameters set GUID; and a message processing unit to verify the manifest digital signature using the public key to ascertain that the request credential manifest was generated by an authorized console platform.

19. The system of claim 1, wherein the first GUID is a client platform GUID.

20. The console platform of claim 6, wherein the update token is a unique value being used by the message generator to construct the request credential manifest.

* * * * *